Dec. 2, 1941.  E. M. SHOOK ET AL  2,264,596
GEOPHYSICAL INSTRUMENT
Filed Oct. 23, 1940
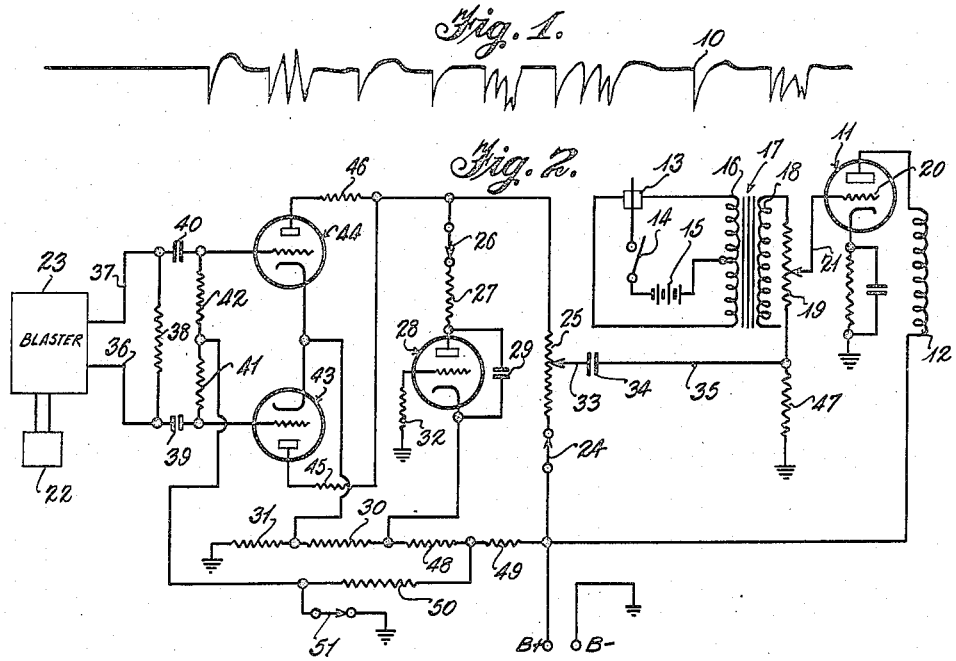
Inventors
Earley M. Shook and
Robert W. Olson
By Dallas R. Lamont
Attorneys Patented Dec. 2, 1941

2,264,596

UNITED STATES PATENT OFFICE 2,264,596

GEOPHYSICAL INSTRUMENT

Earley M. Shook and Robert W. Olson, Dallas, Tex., assignors, by mesne assignments, to Socony-Vacuum Oil Company, Incorporated, New York, N. Y., a corporation of New York Application October 23, 1940, Serial No. 362,473

9 Claims. (Cl. 181—0.5)

This invention relates generally to the art of seismic prospecting and more particularly to a method and apparatus for transmitting a signal indicative of the instant of detonation of a charge of explosives to create seismic waves by means of radio to a recording instrument where it can be recorded.

In conducting a geophysical survey by means of the seismic method, due to the terrain of the area being surveyed, it is often desirable to use radio for communication between the operator of the recording instrument and the shot firer. This is particularly true when the survey is being conducted by the refraction method and the distance between the shot point and the recording instrument is relatively great. In every instance where seismic surveys are conducted, common means are used for both communication and transmission of the time break which is the signal indicative of the instant of detonation of the explosive charge that creates the seismic waves in the earth's surface. It is obvious that when using radio as a means for transmitting the time break to the recording instrument that a radio receiver must be provided at the recording instrument and so connected to the recording galvanometer that the output of the receiver can be recorded on at least one trace of the multiple element galvanometer. The signal commonly used to indicate the instant of detonation of the explosive charge is a transient voltage of extremely short duration that has an abrupt wave front. When this voltage is applied to one of the vibrating elements of a multiple element galvanometer, it will produce a definite break in the trace being recorded by that element which will mark the instant of detonation of the explosive charge which creates the seismic waves that are subsequently on that trace and the other traces of the galvanometer.

Heretofore, under certain atmospheric conditions it has been impossible to receive by radio a time break signal and record it on the trace of a multiple element galvanometer in such a manner that it could be readily distinguished from similar signals being recorded as a result of static being picked up by the radio receiver and transmitted to the galvanometer element. The signals produced by static, when recorded, in every way resemble the time break signal and as a result the interpreter is unable to distinguish between them. Therefore, under certain atmospheric conditions long delays in carrying on the work were experienced.

The instant invention is a solution to the problem recited above in that it provides a method and apparatus for transmitting by radio a signal indicative of the instant of detonation of the explosive charge which when received and recorded by the multiple element galvanometer on a trace of a seismogram will be readily distinguished from any other signals such as might be occasioned by static or other spurious voltages being received.

Therefore, the primary object of this invention resides in the provision of a method and apparatus for transmitting by radio a time break, receiving and recording it in such a manner that it can be readily identified by the interpreter of the seismogram.

Another object of this invention resides in the provision of a novel method and apparatus for modulating a radio carrier wave, by a wave of some lower predetermined frequency until the detonation of the explosive charge and which will be interrupted by the detonation of the charge.

Other objects and advantages will become apparent from the following detailed description when considered with the attached drawing in which:

Figure 1 is an illustration of a seismogram trace that has been recorded under atmospheric conditions which would produce static signals;

Figure 2 is a circuit diagram illustrating the apparatus by means of which the time break is transmitted to the recording instrument;

Figure 3 is an illustration of a trace of a seismogram that has been recorded while using the invention forming the subject matter of this application;

Figure 4 is a series of curves illustrating the manner of operation of the oscillator which places a low frequency signal on the radio carrier wave;

Figure 5 represents the current characteristic of one of the condensers and one of the resistors shown in Figure 2; and Figure 6 is a curve illustrating the transient voltage that is transmitted to the recording instrument as the signal indicative of the instant of detonation of the explosive charge.

Referring to the drawing in detail, particularly Figure 1, there is shown a fragment of a single trace of a seismogram which has been recorded under atmospheric conditions such that considerable static interference was encountered. All of the discontinuities in this trace with the exception of the break at 10 were caused by static. From this trace it is obvious that it would be impossible for an interpreter to distinguish the time break at 10 from any other similar breaks occasioned by static that were recorded. Since all of the data taken from the seismogram in seismic survey is reckoned from the instant of detonation of the explosive charge, illustrated in Figure 1 by the break 10 in the trace, it is necessary that some means be provided whereby the interpreter can definitely select that signal which is the time break.

In Figure 2 there is shown the modulator portion of a radio transmitting circuit in conjunction with a blaster and time break circuit and the oscillator that is used to produce a low frequency voltage that modulates the radio carrier wave. Tube 11 is a conventional modulator tube whose output signal from the plate flows through the coupling inductance 12. Inductance 12 couples this portion of the circuit with any conventional radio transmitter circuit, which is believed to be sufficiently well known that it is unnecessary to illustrate it in the drawing. 13 is a microphone provided with a switch 14 and its associated battery 15 by means of which speech signals are generated in the primary winding 16 of transformer 17. The output speech signals from the secondary 18 of the transformer 17 are impressed across a resistance 19. A portion or all of the voltage produced by current flowing through the resistance 19 can be impressed on the grid 20 of the modulator tube 11 by means of the conductor 21 in a manner well known to those skilled in the art. The speech signals generated in that portion of the circuit described above are used to modulate the carrier wave being sent out by the radio transmitter. The switch 14 of the microphone 13 is preferably of the type that is spring biased to the open position in such a manner that when the microphone is not in use, no signals will be communicated from this circuit through the transformer 17 to the grid of the modulator tube 11. After the explosive charge 22 has been prepared and the blaster and time break circuit illustrated diagrammatically at 23 are connected, and after the recording operator has given the order to fire, switch 24 is closed to complete a circuit from the positive terminal of the B battery through the resistance 25, switch 26 and resistance 27 to the plate of the tube 28 to apply a positive potential to the plate of this tube. Tube 28 is so connected that it will operate as a relaxation oscillator, since condenser 29 is connected in parallel with it. As soon as switch 24 has been closed, a voltage is applied to the plate of tube 28 and to the condenser 29. Condenser 29 has no charge at first, or at most a very low charge. Its surge impedance is very low and therefore little or no voltage can appear across the plate and cathode of the tube 28. The condenser 29, on closing switch 24, will start to charge, drawing current through resistances 25, 27, 30 and 31 and switches 24 and 26. A relatively high negative bias voltage is developed across resistances 30 and 31 and applied to the grid of tube 28 through resistance 32. This high grid bias makes the ionization or break-down voltage of tube 28 relatively high. When the charged potential of condenser 29 reaches the ionizing potential of tube 28, after a finite period of time dependent upon the capacity of condenser 29 and the magnitude of the resistances through which it draws current, the period of time being equal to one cycle of the frequency developed by the oscillator, the tube 28 ionizes, becomes conductive, and will operate to discharge the condenser 29 in the manner illustrated in Figure 4. Figure 4 is a series of curves plotted with charged potential of the condenser 29 as ordinates and time $t$ as abscissae. The succession of loops shown illustrates the manner in which the condenser 29 receives its charge over a period of time $t$. During the interval of time $t$, the charged potential of the condenser 29 rises from zero gradually to a maximum value $E_{29}$ which is the ionizing potential of tube 28, when using a specified grid bias potential. At the end of the period of time $t$ tube 28 ionizes and the condenser rapidly discharges through the tube 28, resulting in a lowering of the charged potential of the condenser to a point where tube 28 is no longer conductive, at which time the cycle will repeat itself. The operation of tube 28 and its associated circuits can be compared to that of a relaxation oscillator. The signal produced by this oscillator is impressed across the resistance 25. The current thus passing through resistance 25 will produce an IR drop which can be communicated by means of the conductor 33, condenser 34, conductor 35, resistance 19 and conductor 21 to the grid of the modulator tube 11, which modulates the carrier wave of the radio transmitter.

By varying the capacity of condenser 29 and the magnitude of the resistances in the circuit of tube 28, the oscillator can be caused to operate at any desired frequency. However, for practical purposes a frequency lying between 300 and 700 cycles has been found to be most desirable.

After switch 24 has been closed to start the oscillator, a signal will be received at the recording instrument which when recorded will resemble that portion of the trace illustrated in Figure 3 denoted by X. The high frequency wave represents the signal produced by the oscillator tube 28 and the high amplitude bursts represent signals produced by static. These static bursts would normally obscure the time break signal. After the shot firer has been given instructions to shoot the explosive charge and the relaxation oscillator has been started, the shot firer will close the blaster circuit to detonate the charge of explosives. The detonation of the charge of explosives produces in the blaster and time break circuit, in the manner known to those skilled in the art, a signal which is conducted by means of conductors 36 and 37 to a load resistor 38. Dependent upon the polarity of the transient voltage impressed across the load resistor 38, one of the condensers 39 or 40 will produce a current through resistors 41 or 42 respectively to cause an I R drop across that particular resistance that will be opposite in polarity to that of the normal grid bias on tube 43 or 44. Tubes 43 and 44 are gas triodes of the type commonly known by the trade name "Thyratron" whose characteristics are well known to those skilled in the art. Since the plate potential of tubes 43 and 44, as supplied by the B battery through switch 24, resistance 25 and resistors 45 and 46 respectively to tubes 43 and 44, remains constant, the variation of the grid bias potential in a positive direction on one of these tubes will cause that particular tube to ionize and become conductive, at which instant a high plate current will begin to flow through the resistance 25 and will continue to flow until switch 24 is opened to remove the plate potential from the particular tube which fired. Since the current through a condenser is proportional to the derivative of the voltage across it, the current through condenser 34 and resistance 47 will be a pulse having a slope as illustrated by the curve A in Figure 5. Curve A in Figure 5 has been plotted with the current through resistance 47, I₄₇, as ordinates and time $t$ as abscissae. Curve B in the same diagram has been plotted with the current through resistance 25, I₂₅, as ordinates and time $t$ as abscissae. From these curves it will be noted that when one of the tubes 43 or 44 becomes conductive, a relatively large current starts to flow immediately through the resistance 25 and continues to flow at a constant value until such time as this circuit is broken by the switch 24. Although the current continues to flow through resistance 25, only an impulse of current equal to the time required to charge condenser 34 will flow through conductor 35, resistance 19 and conductor 21 to the grid of the modulator tube 11 through which it is transmitted by means of the conventional radio transmitter, not shown, to the receiving instrument where it is received and recorded on at least one trace of the seismogram.

The flow of current through the resistance 25, initiated by the firing of the tube 43 or 44, produces an I. R. drop across the resistance 25 which is connected in parallel with the relaxation oscillator that comprises the tube 28 and the condenser 29. The polarity of this voltage is opposite to that impressed across the plate and cathode of tube 28 and as a result the plate potential on tube 28 is reduced and maintained thereafter at a value below the ionization potential of that tube. Therefore, as long as current flows through the resistance 25, this neutralizing potential is maintained across the relaxation oscillator with the result that no further oscillations are produced in the circuit. Due to the fact that the cessation of oscillations produced by the tube 28 and the condenser 29 is effected simultaneously with the detonation of the explosive charge, the trace on the recorded seismogram before and after the detonation of the explosive charge will be as illustrated in Figure 3. That is, the oscillations will be recorded on the trace throughout that portion denoted by X and will stop on the receipt of the time break to definitely mark on the trace the instant of detonation of the explosive charge.

The time break Y on the trace of Figure 3 on the normal record would appear as shown in Figure 6 which represents a curve that has been plotted with the I. R. drop across resistance 47, E₄₇, as ordinates and time $t$ as abscissae.

The remainder of the circuit disclosed is believed to be obvious to those skilled in the art. Bias voltages are supplied by the voltage divider composed of resistances 30, 31, 48, 49 and 50. The switch 51 is provided for test purposes. By opening this switch the grid bias potential can be removed from the tubes 43 and 44 to cause them to become conductive. Switch 24 is also used to break the plate circuit from either tube 43 or 44 to stop the flow of current by removing the plate potential from the tubes.

When it is desired to use the time break circuit disclosed in Figure 2 in a conventional manner, that is, while operating under favorable atmospheric conditions, it is only necessary to open the switch 26 to render the relaxation oscillator inoperative.

Although for purpose of illustration, a specific circuit diagram has been disclosed, it is obvious to those skilled in the art that the novel features of the instant invention can be used with other forms of time break and blaster circuits without departing from the spirit of the invention.

We claim:

1. An apparatus adapted for use in seismic prospecting that comprises in combination means for detonating a charge of explosives to create seismic waves in the earth's surface, a radio transmitter adapted to send out a carrier wave of predetermined frequency, means for modulating the carrier wave with a signal of relatively low frequency, and means for interrupting the modulating signal coincidentally with the detonation of the explosive charge that creates the seismic waves.

2. An apparatus for use in seismic prospecting comprising in combination a radio transmitter adapted to send out a carrier wave of predetermined frequency, means for modulating the carrier wave with a signal of relatively lower frequency, means for generating an electrical signal coincident with the instant of detonation of an explosive charge, means for conducting the generated signal to the modulating circuit of the transmitter for transmission to a remote point, and means operative by said last signal to block the low frequency modulating signal.

3. In an apparatus for use in geophysical prospecting, means for generating an electrical signal coincident with the instant of detonation of an explosive charge to create seismic waves in the earth's surface, a radio transmitter, means for conducting the generated electrical signal to the modulator circuit of the radio transmitter, additional means rendered inoperative by the detonation of the explosive charge for introducing into the modulator circuit of the transmitter a signal of relatively low frequency that will be superimposed on the carrier wave of the radio transmitter, means at a point removed from the radio transmitter for receiving said signals, and means for recording the received signals on a trace of a seismogram.

4. A system for seismic prospecting comprising in combination a blasting machine, means operating in conjunction with the blasting machine for generating a signal coincident with the instant of detonation of an explosive charge, a radio transmitter, means for conducting the generated signal to the radio transmitter for transmission, means for modulating the carrier wave of the radio transmitter with a signal of relatively low frequency, means operative by the signal that has been generated coincident with the instant of detonation of the explosive charge for blocking the modulating signal, means for receiving the signals, and a recording galvanometer operatively connected to the receiving means, whereby the received signals can be recorded on the trace of a seismogram.

5. A system for seismic prospecting comprising in combination a radio transmitter, a blasting circuit, means for generating a signal in the blasting circuit coincident with the instant of detonation of an explosive charge, means for conducting the generated signal to the modulator circuit of the radio transmitter, means rendered inoperative by the generated signal for modulating the carrier wave sent out by the radio transmitter, and means for receiving and recording the transmitted signals on the trace of a seismogram in a distinguishable manner.

6. An apparatus for seismic prospecting comprising in combination means for receiving a composite signal composed of a radio frequency carrier wave, a relatively low frequency modulating wave and a time break signal, and means operable by the time break signal for disrupting the low frequency modulating signal whereby the elimination of the low frequency modulating signal renders distinguishable the impulse representing the time break.

7. An apparatus adapted for use in seismic prospecting comprising in combination a radio transmitter, means connected to the modulator circuit of the radio transmitter for generating a signal coincident with the instant of detonation of an explosive charge, a relaxation oscillator also connected to the modulator circuit of the radio transmitter adapted to produce a modulating signal for the carrier wave sent out by the radio transmitter, means operable by the signal generated coincident with the instant of detonation of the explosive charge for rendering inoperative the relaxation oscillator, and means for receiving and recording these signals in a manner such that the low frequency modulating signal will be recorded on the trace of a seismogram until the signal generated coincident with the instant of detonation of the explosive charge has been received and recorded.

8. A system for transmitting and receiving by radio a time break signal and recording it on a seismogram that comprises in combination a radio transmitter adapted to send out a carrier wave of predetermined frequency, a relaxation oscillator connected to the modulator circuit of the radio transmitter for modulating the carrier wave with a signal of relatively low frequency, means for receiving and recording the modulated wave, a blasting circuit for detonating an explosive charge to create seismic waves in the earth's surface, means associated with the said blasting circuit and electrically connected to the modulating circuit of the radio transmitter for producing and impressing on the modulated carrier wave being sent out by the transmitter, a signal impulse indicative of the instant of detonation of the explosive charge, and means operable by the signal impulse for rendering the relaxation oscillator inoperative and for blocking any other signals that are introduced into the modulating circuit of the radio transmitter.

9. A system for transmitting and receiving by radio a time break signal and recording it on a seismogram that comprises in combination a radio transmitter adapted to send out a carrier wave of predetermined frequency, a relaxation oscillator connected to the modulator circuit of the radio transmitter for modulating the carrier wave with a signal of relatively low frequency, means for varying the frequency of the relaxation oscillator, means for receiving and recording the modulated wave, a blasting circuit for detonating an explosive charge to create seismic waves in the earth's surface, means associated with the said blasting circuit and electrically connected to the modulating circuit of the radio transmitter for producing and impressing on the modulated carrier wave being sent out by the transmitter, a signal impulse indicative of the instant of detonation of the explosive charge, and means operable by the signal impulse for rendering the relaxation oscillator inoperative and for blocking any other signals that are introduced into the modulating circuit of the radio transmitter.

EARLEY M. SHOOK.
ROBERT W. OLSON.